Figure 1:
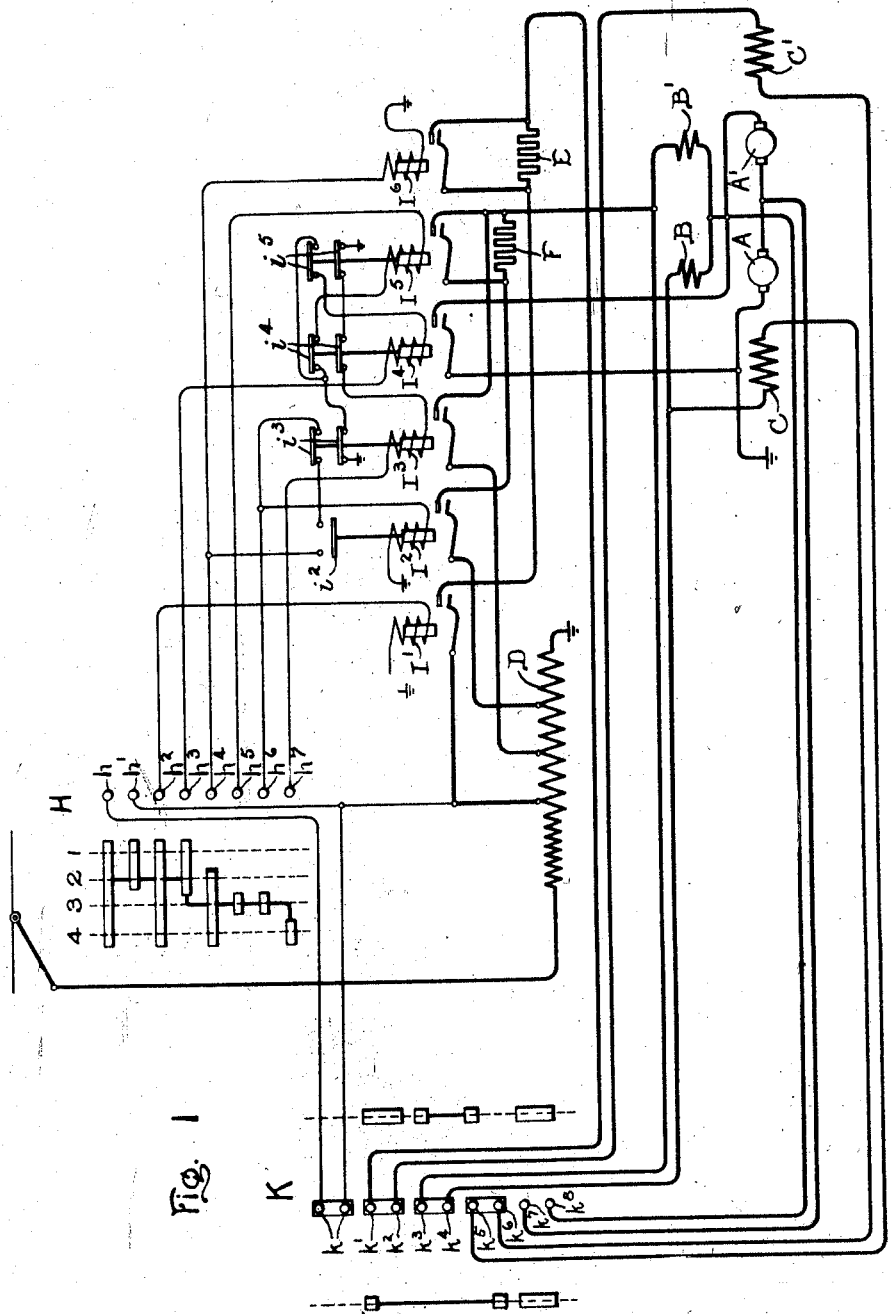

E. F. W. ALEXANDERSON.
ALTERNATING CURRENT MOTOR CONTROL.
APPLICATION FILED JUNE 1, 1908.

946,751.

Patented Jan. 18, 1910.

2 SHEETS—SHEET 1.

WITNESSES.

INVENTOR
ERNST F W ALEXANDERSON
BY
ATTY

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

946,751.  Specification of Letters Patent.  Patented Jan. 18, 1910.

Application filed June 1, 1908. Serial No. 435,858.

*To all whom it may concern:*

Be it known that I, ERNST F. W. ALEXANDERSON, a citizen of the United States, residing at Schenectady, county of Schenectady, in the State of New York, have invented certain new and useful Improvements in Alternating-Current-Motor Control, of which the following is a specification.

My invention relates to the control of alternating-current motors of the commutator type, and particularly to motors arranged for control as described in prior applications of mine, in which the armatures of the motors are short-circuited so as to operate as repulsion motors for low speeds, while for high speeds the short-circuit is opened, and a voltage impressed on the armatures. When thus operating, I term the motors "series repulsion" motors.

It has been the practice heretofore to use four-motor equipments for alternating-current, the principal reason being that since the armatures of alternating-current motors cannot readily be wound for as high voltage as the armatures of direct-current motors, because of commutation difficulties, it is desirable to treat two motors with their armatures connected in series as a unit, and a reserve of motors must always exist, which can be used in case of emergency. However, a four-motor equipment is more expensive than a two-motor equipment, with the same aggregate horse-power. With the type of motor control above mentioned, it is possible, by a suitable arrangement of windings and cut-out switches, to operate one motor, which normally is connected in series with the other motor, on the full potential of the motor circuit. For instance, assume that the motors are operating with their normal connection, two in series, on a voltage of six hundred volts. With such a connection, each motor would be subjected to 300 volts, of which about 225 volts would be at the armature terminals. Now, if the inducing or compensating winding of the motor is given twice the effective number of turns of the armature, then if a single motor is connected in circuit with its armature short-circuited, the induced armature voltage will be approximately 300 volts, which is not too great for proper commutation. Aside from rendering it possible to operate a single motor in this manner on the line voltage, the arrangement of the compensating winding with double the effective turns of the armature has another advantage, pointed out in prior applications, in rendering it possible to start with the exciting winding in series with the inducing winding, and consequently carrying a comparatively weak current, and then switching it over into the armature circuit for high speed operation, so as to increase the current in the exciting winding relative to that in the inducing winding and armature, and thereby to strengthen the motor field and prevent the motor from running at too high a speed. When one of the motors is cut out, it is desirable that the field of the other motor should be strengthened to increase its torque and reduce its speed. This result can be obtained by so proportioning the exciting windings that normally they are connected in parallel with each other, while the armatures and compensating windings of the two motors are in series. Thus, under normal conditions the current in the exciting winding is only half that of the current in the compensating winding, while, when one motor is cut out, the current in the exciting winding of the other is the same as that in the compensating winding. If, when one motor is cut out, the armature short-circuit of the other motor were opened,—or, in other words, if the usual high speed connections were established, an excessive voltage would be impressed on the armature.

One feature of my invention, accordingly, consists in the combination, with a pair of motors which have their armatures normally in series, of a control system arranged to short-circuit the armatures for low-speed operation and to open the short-circuit and impress a voltage on the armatures for high-speed operation, a cut-out switch for cutting either motor out of circuit, and means for preventing the establishment of the high-speed connections when one motor is cut out.

My invention further comprises a cut-out switch arranged, when moved to cut out either motor, to short-circuit the motor armatures on themselves, instead of leaving them short-circuited on each other, as in normal operation.

My invention further comprises certain relative connections of the motor windings.

which have been above referred to, whereby the motors are best adapted for operation together and singly.

My invention will best be understood by reference to the accompanying drawings, in which—

Figure 6:
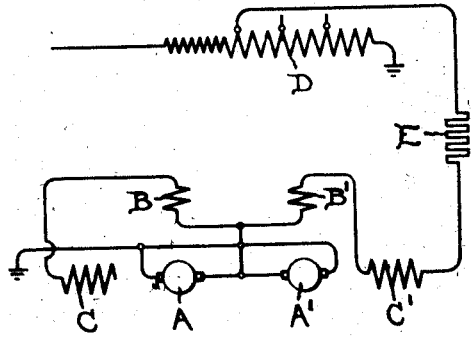
Figure 7:
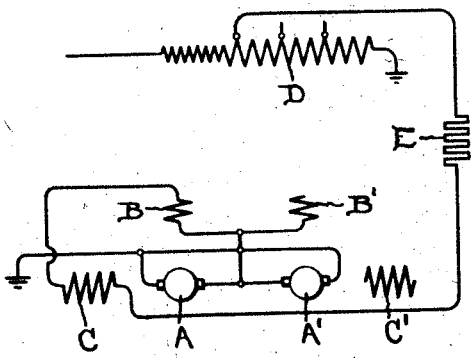

Figure 1 shows diagrammatically a motor control system provided with a cut-out switch arranged in accordance with my invention; Figs. 2, 3, 4 and 5 are diagrams of the normal starting and running connections; Fig. 6 is a similar diagram of the starting connections with one motor cut out; and Fig. 7 is a similar diagram with the other motor cut out.

In the drawings A A' represent the armatures, B B' the exciting windings, and C C' the inducing windings of a pair of single-phase motors. The windings C C', which act as inducing windings for repulsion-motor operation, may, with equal propriety, be termed the "compensating windings" when the motors are operating as series-repulsion motors at high speed. To avoid unnecessary words, I shall simply term these windings the "inducing windings", with the understanding that the term means simply a winding which produces a magnetomotive force in line with that of the armature.

D represents a transformer for supplying current to the motors, E represents a starting resistance, and F a resistance which is used in making certain transfer connections, H represents a master controller, which is shown diagramatically with its contacts developed on a plane surface. The master controller controls the motors through magnetically-actuated switches or contactors $I^1$ to $I^6$. Certain of these contactors are provided with interlocking contacts $i^2$ to $i^5$, to insure the proper sequence of operations.

K represents the cut-out switch which, like the master controller, is shown with its contacts developed on a plane surface. This switch comprises eight main contact fingers $k^1$ to $k^8$, and two auxiliary contacts $k$.

With the exception of the cut-out switch and one additional finger on the master controller, the arrangement of the control system is the same as that disclosed in my former application, Serial No. 409,271, filed January 4, 1908, but this system and the circuit connections which it produces will be described briefly here, in order to facilitate the understanding of my present invention.

Figure 2:
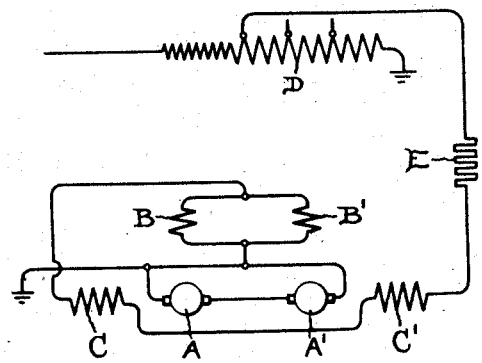
Figure 3:
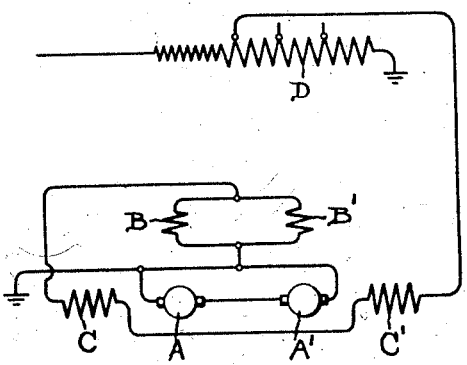
Figure 4:
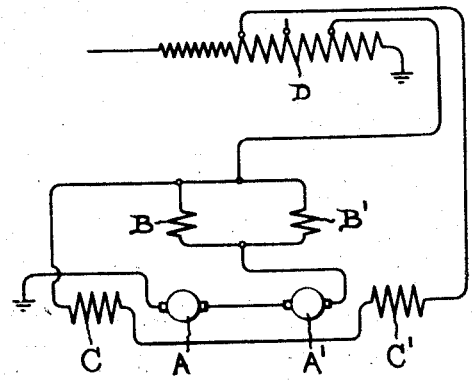
Figure 5:
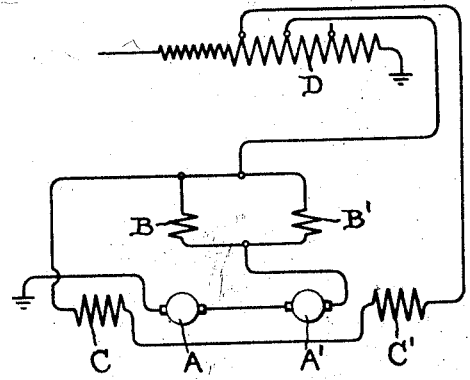

The running positions of the master control switch H are indicated by four dotted lines numbered 1 to 4. When the switch H is moved to its first running position, indicated by dotted line 1, a circuit is closed from transformer D, through contact fingers $h$ and $h^1$, which are connected together through auxiliary contacts $k$ on cut-out switch K, to contact finger $h^2$ and contactor $I^1$, which is accordingly energized and closes the motor circuit. At the same time, a circuit is closed through contact fingers $h$ and $h^3$, through contactor $I^4$, which short-circuits the motor armatures on each other. The circuit connections shown in Fig. 2 are consequently established, and may be traced as follows: from transformer D through contacts of contactor $I^1$, resistance E, contacts $k^1$ and $k^2$ of the cut-out switch, inducing winding $C^1$, contacts $k^5$ and $k^6$, inducing winding C, then through exciting windings B and $B^1$ in parallel, the upper terminals of these two windings being connected together through contacts $k^3$ and $k^4$, to contact of contactor $I^4$, to ground. It will be noted that the connection from the lower terminal of the actuating winding of contactor $I^4$ to ground is made through upper contact $i^5$ of contactor $I^5$, and lower contact $i^3$ of contactor $I^3$. The purpose of this connection will hereinafter appear. At starting both contactors $I^3$ and $I^5$ are deënergized, so that contacts $i^3$ and $i^5$ are closed. When switch H is moved to its second position, indicated by dotted line 2, the only change is the energizing of contactor $I^6$, which short-circuits resistance E, leaving the connections as shown in Fig. 3. This is the last of the low-speed connections. As the switch H is moved from its second to its third running position, the latter of which is indicated by dotted line 3, several operations of the contactors result, producing several transitional connections before establishing the running connections corresponding to the third position of switch H. Contacts $h^5$ and $h^6$ are simultaneously energized, but the contactor $I^5$ connected to contact finger $h^5$ is not at first actuated, since its circuit is open at the upper contact $i^4$ of contactor $I^4$. Contactor $I^2$ is, however, energized, thereby establishing the connection from the junction of exciting windings B and inducing windings C, through resistance F, to an intermediate point on transformer D. Nothing further happens until contact finger $h^3$ is deënergized, when contactor $I^4$ drops. The dropping of contactor $I^4$ causes contactor $I^5$ to pick up, the circuit being closed through the contact fingers $h^1$ and $h^5$, contactor $I^5$, upper contact $i^4$ and lower contact $i^3$. The picking up of contactor $I^5$ short-circuits the resistance F, and establishes the connections which are the running connections for the third position of the master switch H. These connections are shown in Fig. 4. The successive operations of contactors $I^2$, $I^4$ and $I^5$ follow automatically in their proper sequence, because of their interlocking connections and contacts. When switch H is moved from its third to its fourth, and final position, contact finger $h^7$ is energized, but contactor $I^3$ does not at once pick up, since its circuit is opened by the lower contact $i^5$. As soon as contact finger $h^5$ leaves its movable contact, contactor I⁵ is deënergized, opening the short-circuit around resistance F. The closing of lower contact i⁵ energizes contactor I³, which picks up. Contact finger h⁶ has been deënergized before this, but contactor I² does not fall until after contactor I³ picks up, on account of the maintaining circuit formed from the lower terminal of contactor I², through upper contact i³ and contact i² to contact finger h⁴. As soon as contactor I³ picks up, this circuit is broken, and contactor I² trips, thereby establishing the final running connections shown in Fig. 5.

The purpose of the particular arrangement of interlocking contacts, above described, need not be considered in detail, since it forms no part of my present invention. It is to be noted, however, that while the armatures of the motors are short-circuited in positions 1 and 2 of the master switch, the short-circuit is open in positions 3 and 4. Consequently, in order to prevent an excessive voltage being impressed on the armature of a single motor when the other is cut out, it is essential that the high-speed connections established by the master switch in its third and fourth positions should not be established. It is to prevent the establishment of the high-speed connections that auxiliary contacts k are provided on the cut-out switch K. These contacts, when the cut-out switch is in its normal position with both motors in circuit, connect together contacts h and h¹ of the master controller, so that contact finger h is at all times connected to transformer D. When, however, the cut-out switch K is thrown in either direction from its normal position, in order to cut out one motor or the other, contact h is open-circuited, so that contact finger h¹ is the only contact finger of the master controller which is then connected to transformer D. Consequently, if the master controller is moved beyond its second position, all the contactors are deënergized, and the motor circuit is open. Thus, the establishment of the high-speed connections is prevented when either motor is cut out. The circuit changes, produced by throwing the switch K to either of its other positions, will be obvious from an inspection of the switch connections taken in connection with Figs. 6 and 7, which two figures show each of the motors in turn cut out. It will be noted that in either extreme position of the cut-out switch, each motor is short-circuited on itself, through contacts k⁷ and k⁸, instead of being short-circuited through the other armature as in normal operation. It will further be noted that the two exciting windings B B′ are in parallel in normal operation, while the inducing windings and armatures are in series, so that the current in each exciting winding is one-half that in the inducing winding; but that when either motor is cut out, the exciting winding of the other motor is in series with the inducing winding, so that the same current flows through both, and consequently the torque of the motor is increased and its speed diminished.

I do not desire to limit myself to the particular construction and arrangement of parts here shown, but aim in the appended claims to cover all modifications which are within the scope of my invention.

What I claim as new and desire to secure by Letters Patent of the United States, is:

1. In combination with a pair of alternating-current motors of the commutator type having their armatures normally connected in series, a control system arranged to short-circuit said armatures for low-speed operation and to open the short-circuit and impress a voltage on said armatures for high-speed operation, a cut-out switch arranged to cut either of said motors out of circuit, and means for preventing the establishment of the high-speed connections when one motor is cut out.

2. In combination with a pair of alternating-current motors of the commutator type having their armatures normally connected in series, a control system arranged to short-circuit said armatures for low-speed operation and to open the short-circuit and impress a voltage on said armatures for high-speed operation, a cut-out switch arranged to cut either of said motors out of circuit, and means controlled by the cut-out switch for rendering the control system inoperative to establish the high-speed connections when one motor is cut out.

3. In combination with a pair of alternating-current motors of the commutator type having their armatures normally connected in series, a control system arranged to short-circuit said armatures for low-speed operation and to open the short-circuit and impress a voltage on said armatures for high-speed operation, a cut-out switch arranged to cut either of said motors out of circuit, and auxiliary contacts on the cut-out switch controlling the high speed connections of the control system.

4. In combination with a pair of alternating-current motors of the commutator type having their armatures normally connected in series, a control system arranged to short-circuit said armatures on each other for low-speed operation and to open the short-circuit and impress a voltage on said armatures for high-speed operation, and a cut-out switch arranged to short-circuit each armature directly on itself.

5. In combination with a pair of alternating-current motors of the commutator type, having their armatures normally connected in series and their exciting windings in parallel, a control system arranged to short-circuit said armatures on each other for low-speed operation and to open the short-circuit and impress a voltage on said armatures for high-speed operation, and a cut-out switch arranged to short-circuit each armature directly on itself and to open the circuit of either exciting winding.

6. In combination with a pair of alternating-current motors of the commutator type having inducing and exciting windings on their stators and having their armatures normally connected in series, their exciting windings in parallel, and their inducing windings in series, a control system arranged to short-circuit said armatures on each other for low-speed operation and to open the short-circuit and impress a voltage on said armatures for high-speed operation, and a cut-out switch arranged to short-circuit each armature directly on itself and to open the circuits of inducing and exciting windings on either motor.

7. In combination with a pair of alternating-current motors of the commutator type having their armatures normally connected in series, a control system arranged to short-circuit said armatures on each other for low-speed operation and to open the short-circuit and impress a voltage on said armatures for high-speed operation, a cut-out switch arranged to short-circuit each armature directly on itself, and means for preventing the establishment of the high-speed connections when one motor is cut out.

8. In combination with a pair of alternating-current motors of the commutator type having their armatures normally connected in series and their exciting windings in parallel, a control system arranged to short-circuit said armatures on each other for low-speed operation and to open the short-circuit and impress a voltage on said armatures for high-speed operation, a cut-out switch arranged to short-circuit each armature directly on itself and to open the circuit of either exciting winding, and means for preventing the establishment of the high-speed connections when one motor is cut out.

9. In combination with a pair of alternating-current motors of the commutator type having inducing and exciting windings on their stator and having their armatures normally connected in series, their exciting windings in parallel, and their inducing windings in series, a control system arranged to short-circuit said armatures on each other for low-speed operation and to open the short-circuit and impress a voltage on said armatures for high-speed operation, a cut-out switch arranged to short-circuit each armature directly on itself and to open the circuits of inducing and exciting windings on either motor, and means for preventing the establishment of the high-speed connections when one motor is cut out.

In witness whereof, I have hereunto set my hand this 29th day of May, 1908.

ERNST F. W. ALEXANDERSON.

Witnesses:
HELEN ORFORD,
BENJAMIN B. HULL.